United States Patent

[11] 3,588,532

[72] Inventor Frank Fellinger
West Lafayette, Ind.
[21] Appl. No. 855,291
[22] Filed Sept. 4, 1969
[45] Patented June 28, 1971
[73] Assignee GTE Automatic Electric Laboratories Incorporated

[54] MEMORY SENSING CIRCUIT INCLUDING A COMBINED ADDER AND AMPLIFIER STAGE
3 Claims, 3 Drawing Figs.

[52] U.S. Cl. .......... 307/233, 307/235, 330/30, 330/94
[51] Int. Cl. .......... H03k 5/20
[50] Field of Search .......... 307/235, 233; 330/30 (D), 69, 94

[56] References Cited
UNITED STATES PATENTS
3,432,831 3/1969 Xylander .......... 340/174
3,519,850 7/1970 Smith .......... 307/235

*Primary Examiner*—Donald D. Forrer
*Assistant Examiner*—John Zazworsky
*Attorneys*—Cyril A. Krenzer, K. Mullerheim, B. E. Franz and Glenn H. Antrim

ABSTRACT: In circuits for sensing the switching of cores in two-wire, 2½D memories, a pair of transistors are connected to function as a differential adder at low frequencies to eliminate a pedestal voltage that is split into two signals of opposite polarity by a preceding differential amplifier circuit, and to function as an amplifier at higher frequencies to amplify signals resulting from the switching of cores.

PATENTED JUN 28 1971 3,588,532

INVENTOR
FRANK FELLINGER
BY Glenn H. Antrim
ATTORNEY

MEMORY SENSING CIRCUIT INCLUDING A COMBINED ADDER AND AMPLIFIER STAGE

BACKGROUND OF THE INVENTION

This invention relates to differential amplifiers having high common mode signal rejection, and particularly to magnetic memory sensing circuits, each circuit having a stage which functions as a differential adder for the pedestal of a core drive signal and as an amplifier for core read signal imposed on that pedestal.

Each magnetic core of a memory matrix has usually been threaded with a separate sense line in addition to two lines for coordinate half-select switching currents. As cores have been made progressively smaller, and therefore the operation of threading wires through the cores for the lines has become increasingly difficult, the number of lines through the cores has been decreased to the two required for coordinate switching. The signal voltage resulting from switching of a core is derived from one of these lines used for half-select switching current. Since this signal derived from switching has a relatively small amplitude and short period, it appears as a relatively small signal imposed intermediate a pedestal voltage resulting from half-select current.

The drive circuits for switching cores have been arranged as balanced lines, and sensing circuits connected to the balanced lines have been designed to attenuate the pedestal voltage and to amplify the core signal. In U.S. Pat. No. 3,293,626 issued to R. E. Thome on Dec. 20, 1966, read-bit, half-select lines are driven in balanced pairs, and different cores and respective read-word lines are associated with a different line of each pair of the read-bit lines. A transformer has a pair of balanced primary windings connected serially in a mutually opposing sense for driving, half-select current applied simultaneously to a selected pair, but connected in an aiding sense for a core signal originating in an individual line of the selected pair. The half-select drive current is canceled according to the degree of balance of the primary windings of the transformers. The core signal having inverse phases on the pair of lines is induced into a secondary winding and applied to a sense amplifier to which a strobing signal is also applied to enable the amplifier only when the core signal is present. The strobing eliminates high amplitude, inductive noise developed at the beginning and at the end of half-select current pulses.

Memory systems in which only two lines are threaded through each of their magnetic cores are commonly arranged in a configuration colloquially called 2½ D. The 2½ D memories described in the articles mentioned below have the read-bit lines connected in pairs, and each read-word line is connected through an individual core on each line of a pair of the read-bit lines. In these systems, each read-word line threads alternate cores in a different sense with respect to the read-bit line so that the direction of current flow in the read-word line determines which core of a selected pair is to be switched. As in the system described in U.S. Pat. No. 3,293,626 mentioned above, the voltage present between the lines during a reading interval is a relatively small signal voltage imposed on a common mode pedestal voltage developed by half current applied to switch a core.

The problem of sensing the small core switching signal is presented in an article "A 2.5 D Ferrite Memory Sense Amplifier" by A. M. Patel and J. W. Sumilas published on page 58 of Vol. SC-1, No. 1, Sept. 1966 issue of IEEE Journal of Solid State Circuits. The sense amplifier circuit described there uses a delay line preceding a differential amplifier. The delay line functions as a differentiator to reject pedestal noise.

Another sense amplifier circuit is described in an article "A Twenty Million Bit High Speed Core Memory" by Roy Norman published in the Dec. 1967 issue of Computer Design. A differential amplifier, a direct current restorer, and another differential amplifier are connected in cascade. The input of the first differential amplifier is connected between a pair of read-bit lines, and the output of the second differential amplifier is connected through a rectifier circuit to a discriminator. To remove the pedestal voltage from the input of the second differential amplifier, the direct current restorer uses a chopper transistor to charge a capacitor to the pedestal voltage just before the core signal is to be sensed.

SUMMARY OF THE INVENTION

An object of the present invention is to provide a sensing circuit having fast recovery from start of a pedestal and fast sensing of core switching signal superimposed on the pedestal.

Another object is to provide a simple differential adder and pulse amplifier circuit that can be manufactured at low cost.

A feature of the circuit is the use of a stage that is a combined DC (direct current) differential adder and pulse amplifier. Preferably a differential amplifier precedes this combined stage. The preceding amplifier rejects much of this pedestal voltage of a signal such as that derived from 2½ D memory lines and passes the remaining differential signal and noise signal to the input of the adder and pulse amplifier stage. This stage at low frequency functions as an adder to remove differential noise signal resulting from core drive currents and at higher frequencies functions as an amplifier to amplify the differential core switching signal.

The circuit is relatively simple and has fast response for rapid reading of memory matrices. In the DC differential adder and pulse amplifier stage, two transistors have separate inputs but have a common output load circuit to provide the adding function (in this use, cancellation because of equal inverse input voltages) at low frequencies; however, the bias circuits of the transistors have different frequency characteristics so that the stage functions as an amplifier. If this circuit were included in the sense amplifier circuits described in U.S. Pat. No. 3,293,626, it would cancel differences in drive voltage resulting from unbalance between the balanced drive circuits connected to pairs of read-bit lines.

DESCRIPTION OF THE PREFERRED EMBODIMENTS

Figure 1:
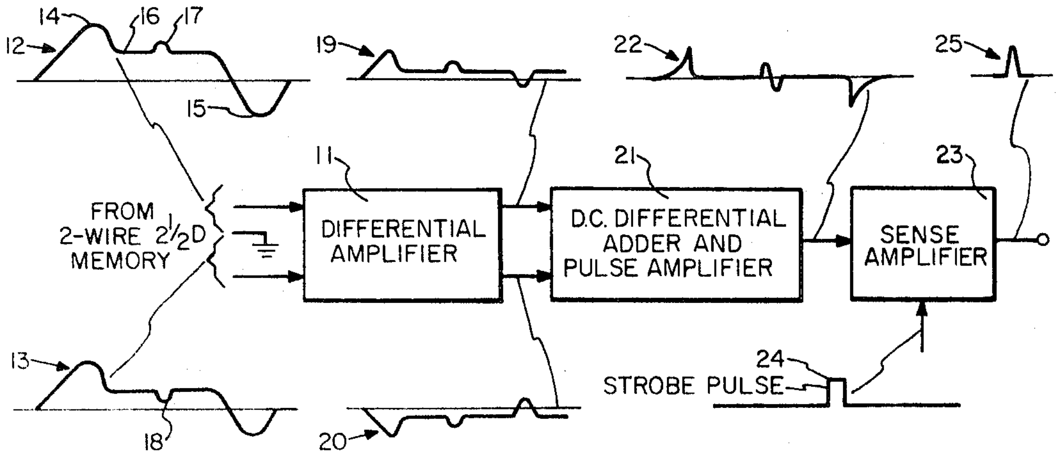
FIG. 1 is a block diagram of the memory pulse sensing amplifier of this invention shown with waveform diagrams.

A conventional differential amplifier stage 11 of FIG. 1 has two inputs to which respective signal voltages having waveforms 12 and 13 are applied with respect to a common circuit or ground. The voltages for these inputs may be derived from a pair of read-bit lines of a type 2½ D magnetic core memory. Typically, the voltage of a waveform 12 applied to one of the input circuits has an inductive peak 14 at the beginning of the waveform, a pedestal 16 after the inductive portion has decayed, a small voltage 17 derived from a core switching signal superimposed on the pedestal, and an inductive peak 15 at the end of the waveform. The waveform 13 applied to the other input of the differential amplifier 11 is similar except that a voltage 18 derived from the core switching signal has a phase which is inverse to that of the core switching signal 17 of the waveform 12. Since the pair of read-bit lines are usually not perfectly balanced, the signals applied to one input of the differential amplifier 11 are generally greater in amplitude than the signals applied to the other input. Assuming that signal 12 has a greater amplitude than the signal 13, signals having waveforms 19 and 20 with respect to ground are present on the output terminals of the differential amplifier 11. Since these signals are derived from the difference of the input signals 12 and 13, the in-phase components are derived from the read-bit signals have been reduced in amplitude; whereas, the core switching signal voltage has been increased in amplitude. Also, the differential output has been split so that the respective voltages on the output terminals have opposite polarities.

The DC differential adder and pulse amplifier 21 may have circuits similar to those shown in FIGS. 2 and 3 described below. For low frequencies, the circuit 21 functions as an adder so that the pedestals of opposite polarities applied to the inputs are canceled as shown in waveform 22 for the signal appearing at the output of the adder and amplifier 21. Higher frequency components appearing during core switching and also at the ends of the half current drive periods are amplified and because of the frequency characteristics of the circuit 21, tend to be differentiated so that the core switching signal has a positive and a negative portion as shown in the intermediate portion of the waveform 22.

A usual sense amplifier 23 has an input connected to the output of the combined adder and amplifier 21, and another input connected to a source for applying a strobe pulse having a waveform 24 for enabling the sense amplifier only during a portion of the period when the core switching voltage is present; for example, when the first portion having a particular polarity is present, the output of the sense amplifier 23 is an amplifier pulse having a waveform 25.

Figure 2:
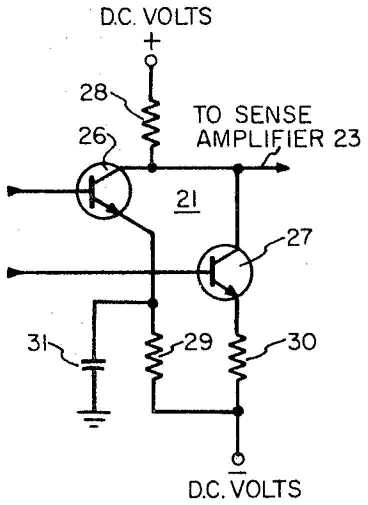
FIGS. 2 and 3 are schematic diagrams of different embodiments of differential adder and pulse amplifier stages to be connected according to FIG. 1.

The DC differential adder and pulse amplifier 21 of FIG. 2 has two similar transistors 26 and 27. The signals 19 and 20 of the opposite polarities are applied from the outputs of the differential amplifier 11 to the respective bases of the transistors 26 and 27. The output emitter-collector circuits include a common output resistor 28 and individual bias resistors 29 and 30. The collectors of the transistors 26 and 27 are connected through the common resistor 28 to a source of DC voltage, and the output to the sense amplifier 23 is connected to sense the signal voltage developed across the resistor. The emitters of the transistors 26 and 27 are connected through the resistors 29 and 30 respectively to the other terminal of the source of DC voltage. The resistors 29 and 30 have sufficiently high resistance to provide nearly unity gain through both transistors 26 and 27 at low frequencies. A capacitor 31 is connected to the emitter of the transistor 26 to function as a bypass across the bias resistor 29, and it has sufficiently low impedance at the frequency of the core switching signal to increase the gain of the transistor 26 to a value greater than that of the transistor 27 so that differential amplified core switching signal is developed across the output resistors 28. At low frequencies the capacitor 31 has little effect, and the current flow through the common load resistor 28 is not changed by changes in the amplitude of the pedestals at the output of the differential amplifier 11.

Figure 3:
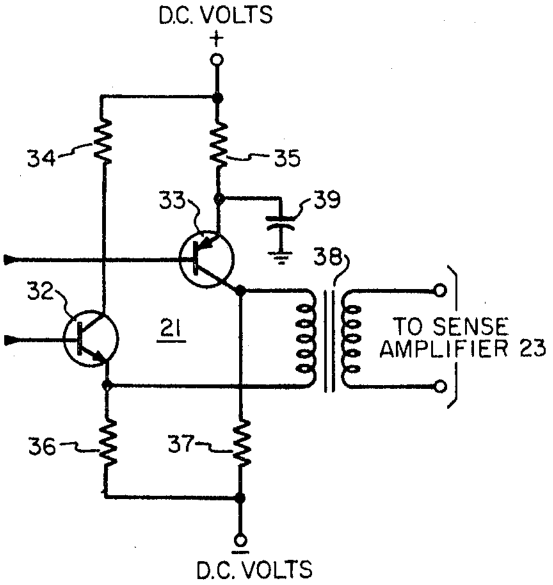

In FIG. 3, another embodiment of the DC differential adder and pulse amplifier 21 has a pair of complementary transistors 32 and 33. The bases of the transistors 32 and 33 are connected to the respective outputs of the differential amplifier 11. The collector of a type NPN transistor 32 is connected through a resistor 34 to the positive terminal of a source of DC voltage, and the emitter of a type PNP transistor 33 is connected through a resistor 35 to the same terminal. The emitter of the transistor 32 is connected through a resistor 36 to the negative terminal of the source of DC voltage, and also the collector of the transistor 33 is connected through a resistor 37 to the same terminal. The difference in the voltages developed across the resistors 36 and 37 is applied across the primary winding of a transformer 38 which is connected between the emitter of the transistor 32 and the collector of the transistor 33. The secondary of the transformer 38 is connected to the input of a sense amplifier that preferably has a balanced input circuit. Equal signals of opposite polarity applied to the input circuits cause the current in the emitter-collector circuits of the transistors 32 and 33 to change in unison as long as the current gain of the transistors 32 and 33 are equal so that difference in voltage across the resistors 36 and 37 is constant and voltage across the primary of the transformer 38 is zero. For direct current, the primary winding of the transformer 38 is a low resistance shunt between the emitter of the transistor 32 and the collector of the transistor 33. To provide greater gain in the transistor 33 than in the transistor 32 for core switching signals, a capacitor 39 may be connected between the emitter of the resistor 33 and ground. This capacitor may be unnecessary because of the inherent greater capacitance of the emitter circuit of the transistor 33 compared with the inherent capacitance of the collector of the transistor 32 which is connected to a corresponding point in the circuit.

Alternately, the circuit in FIG. 3 can be modified somewhat so that both of the transistors are of the same type with the collectors of the transistors connected through separate resistors to a terminal of the source of DC current. The primary winding of the transformer 38 is then connected to the collector of one of the transistors and through a coupling capacitor to the emitter of the other transistor. As shown in FIG. 2, when the transistors are the same type, a capacitor needs to be connected between the emitter of one transistor and ground to provide the necessary unbalance and gain at the frequencies of the core switching signal.

I claim:

1. A pulse sensing amplifier circuit with high common mode rejection comprising:

a combined low frequency differential adder and a pulse amplifier having first and second amplifying devices, said amplifying devices having individual input circuits, means for connecting said input circuits to a substantially balanced signal line having common mode pedestal voltage pulses of like polarity on each of its conductors and relatively small, short signal pulses superimposed on the intermediate portion of said pedestal voltage pulses, the phase of said signal pulses on one conductor of said line being inverted relative to the phase of signal pulses on the other conductor of said line, said means applying to said input circuits the difference voltage between said conductors of said line including the difference between said pedestal voltage pulses on each of said conductors due to unbalance of said line, said amplifying devices having a common output load circuit but individual biasing circuits, said biasing circuits having different frequency characteristics to cause equal gain of said amplifying devices over periods comparable to the intermediate period of said pedestal voltage pulses but cause unequal gain for voltage changes occurring over periods comparable to the period of said signal pulses so that said combined adder and amplifier functions as differential adder to cancel said common mode pedestal voltage pulses and as an amplifier to pass said signal pulses, and means connected to the output load circuit of said combined adder and amplifier to sense said signal pulses.

2. A pulse sensing amplifier circuit according to claim 1 in which said first and second amplifying devices of said combined low frequency differentiator and pulse amplifier are transistors of the same type, each of said transistors having an emitter, a base, and a collector, said input circuits including said bases, said biasing circuits including a biasing resistor connected in series in the emitter-collector circuit of each of said transistors, said common output load circuit including a load resistor, a source of direct current, the collectors of said transistors being connected through said load resistor to one terminal of said source and said emitters of said transistors being connected individually through said respective biasing resistors to the other terminal of said source, and a capacitor connected to bypass one of said resistors in said biasing circuits to provide said different frequency characteristics.

3. A pulse sensing circuit according to claim 1 in which said first and second amplifying devices of said combined low frequency differentiator and pulse amplifier are complementary first and second transistors, each of said transistors having an emitter, a base, and a collector, said input circuits including said bases, a source of direct current, said biasing circuits including a resistor connected from one terminal of said source to the collector of said first transistor and a resistor connected from the same terminal of said source to the emitter of said second transistor, an output transformer, said common output load circuit including a resistor connected from the other terminal of said source to the emitter of said first transistor, a resistor connected from said other terminal of said source to the collector of said second transistor, and the primary winding of said output transformer connected between the emitter of said first transistor and the collector of said second transistor.